United States Patent
Hattori (10) Patent No.: US 9,796,253 B2
(45) Date of Patent: Oct. 24, 2017

(54) DEFLECTOR DEVICE

(71) Applicant: AISIN SEIKI KABUSHISIKI KAISHA, Kariya-shi, Aichi-ken (JP)

(72) Inventor: Takanori Hattori, Ama-gun (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/267,491

(22) Filed: Sep. 16, 2016

(65) Prior Publication Data

US 2017/0080788 A1    Mar. 23, 2017

(30) Foreign Application Priority Data

Sep. 18, 2015   (JP) .................................. 2015-185273

(51) Int. Cl.
    *B60J 7/22*            (2006.01)
(52) U.S. Cl.
    CPC ...................................... *B60J 7/22* (2013.01)
(58) Field of Classification Search
    CPC ........................................................ B60J 7/22
    USPC ....................................................... 296/217
    See application file for complete search history.

(56) References Cited

U.S. PATENT DOCUMENTS

| 6,357,823 B1 * | 3/2002 | Birndorfer ................. B60J 7/22 296/217 |
| 6,877,800 B2 | 4/2005 | Maeta et al. |
| 7,404,599 B2 | 7/2008 | Fukami |

FOREIGN PATENT DOCUMENTS

| JP | 2003-341368 | 12/2003 |
| JP | 2006-341788 | 12/2006 |
| JP | 2012-106743 | 6/2012 |

* cited by examiner

*Primary Examiner* — Dennis H Pedder
(74) *Attorney, Agent, or Firm* — Finnegan, Henderson, Farabow, Garrett & Dunner, LLP (57) ABSTRACT

A deflector device includes: a deflector (20) that includes a deflector body (21) extending in a width direction of a vehicle and arm portions (22) respectively connected to both end portions of the deflector body, and protrudes upward from a roof (10) as the deflector is turned in one direction, and is stored below the roof as the deflector is turned in the other direction; a biasing member (40) biasing the deflector in a turning direction where the deflector protrudes upward; and a stopper member (30) which is connected to the deflector such that the stopper member can be turned around the axial line extending in the width direction of a vehicle, and which maintains the position of the deflector, and whose fallen position is maintained by a housing (14) provided in a front edge portion of opening (11) in a state where the deflector is stored below the roof.

4 Claims, 7 Drawing Sheets

DEFLECTOR DEVICE

CROSS REFERENCE TO RELATED APPLICATIONS

This application is based on and claims priority under 35 U.S.C. §119 to Japanese Patent Application 2015-185273, filed on Sep. 18, 2015, the entire contents of which are incorporated herein by reference.

TECHNICAL FIELD

This disclosure relates to a deflector device.

BACKGROUND DISCUSSION

A deflector device in the related art is disclosed in JP 2006-341788A (Reference 1). A deflector of the deflector device includes a deflector body (deflector panel) extending in a width direction of a vehicle along a front edge portion of an opening formed in a roof of the vehicle, and a pair of arm portions which extend toward the rear side of the vehicle from both end portions of the deflector body in the width direction of the vehicle, and are turnably supported by both side edge portions of the opening in the width direction of the vehicle. The deflector includes a pair of connectors which are joined integrally to both end portions of the deflector body in the width direction of the vehicle, and are turnably connected to both the arm portions. That is, both the end portions of the deflector body in the width direction of the vehicle are respectively turnably connected to the arm portions via the connectors.

If the arm portions are turned in one direction around an axial line in each of the side edge portions of the opening in the width direction of the vehicle, the deflector protrudes upward from the roof (deployed state). Alternatively, if the arm portions are turned in the other direction, the deflector is stored below the roof (stored state). The connector includes a contact surface that restricts the turning of the arm portion by coming in contact with a stopper surface of the arm portion during deployment, and a pedestal portion that restricts the upward protrusion of the deflector to a predetermined range by coming into contact with a flange of the opening. As a result, the position of the deflector in a deployed state is maintained. In contrast, the connector includes a roller which rolls along an inclined surface formed in a housing during storage, and turns the arm portion such that the deflector body is placed into a fallen position. As a result, it is possible to ensure the amount of upward protrusion (the amount of deployment) of the deflector in a deployed state while the required disposition space of the deflector in a stored state in the height direction of the vehicle is kept small.

In the deflector device disclosed in Reference 1, in an assembly step of the deflector, the connector is required to be joined integrally to the end portion of the deflector body in the width direction of the vehicle, and to be turnably connected to each arm portion. Detailed description is not given, but it is assumed that complicated assembly is required.

SUMMARY

Thus, a need exists for a deflector device which is not suspectable to the drawback mentioned above.

A deflector device according to an aspect of this disclosure includes: a deflector that includes a deflector body extending in a width direction of a vehicle along a front edge portion of an opening formed in a roof of the vehicle, and a pair of arm portions which are respectively connected to both end portions of the deflector body, and extend toward a rear side of the vehicle, and whose tip end portions are respectively supported by both side edge portions of the opening such that the pair of arm portions can be turned around an axial line extending in the width direction of the vehicle, and that protrudes upward from the roof as the deflector is turned in one direction, and is stored below the roof as the deflector is turned in the other direction; a biasing member that biases the deflector in a turning direction in which the deflector protrudes upward from the roof; and a stopper member which is connected to the deflector such that the stopper member can be turned around the axial line extending in the width direction of the vehicle, and which maintains the position of the deflector by being in contact with the deflector and the roof in a state where the deflector protrudes upward from the roof, and whose fallen position is maintained by a housing provided in the front edge portion of the opening in a state where the deflector is stored below the roof, and in which the deflector includes: a pair of support walls which are provided side by side in the width direction of the vehicle, and in which bearing recessed portions, which are recessed oppositely in the width direction, are formed; a pair of supported walls which are interposed between both the support walls in the width direction of the vehicle, and are provided in the stopper member side by side in the width direction, and in which shaft portions to be fitted into the bearing recessed portions respectively protrude from tip end portions of the supported walls; a fitting recessed portion that is formed in one of the deflector and the stopper member, and a fitting piece which protrudes from the other of the deflector and the stopper member, and restricts elastic deformation of both the supported walls in the width direction of the vehicle, which causes both the supported walls to approach each other, by being fitted into the fitting recessed portion in a state where the deflector protrudes upward from the roof.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a deflector device in one embodiment will be described. Hereinafter, a "forward and rearward direction" refers to a forward and rearward direction of a vehicle. An "upper side" and a "lower side" respectively refer to the upper side and the lower side of the vehicle in a height direction of the vehicle. In addition, a "vehicle interior side" refers to the inside of the vehicle in a width direction of the vehicle, which indicates a passenger compartment side. A "vehicle exterior side" refers to the outside of the vehicle in the width direction, which indicates the outside of a passenger compartment.

Figure 1:
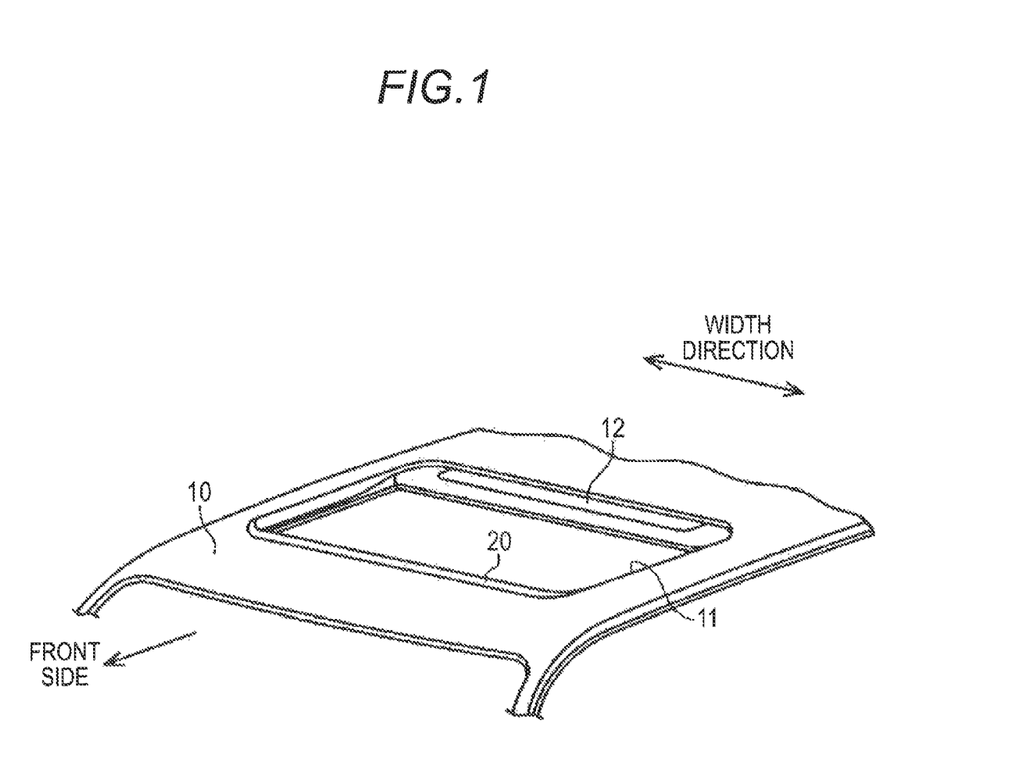
FIG. 1 is a perspective view illustrating a roof to which a deflector device of an embodiment is applied.

As illustrated in FIG. 1, a substantially rectangular opening 11 is formed in a roof 10 of a vehicle such as an automobile. A deflector 20 extending along a front edge portion of the opening 11 in the width direction of the vehicle is supported on the roof 10. A substantially rectangular movable panel 12 made of a glass plate or the like is supported on the roof 10, and is capable of opening and closing the opening 11.

Figure 2:
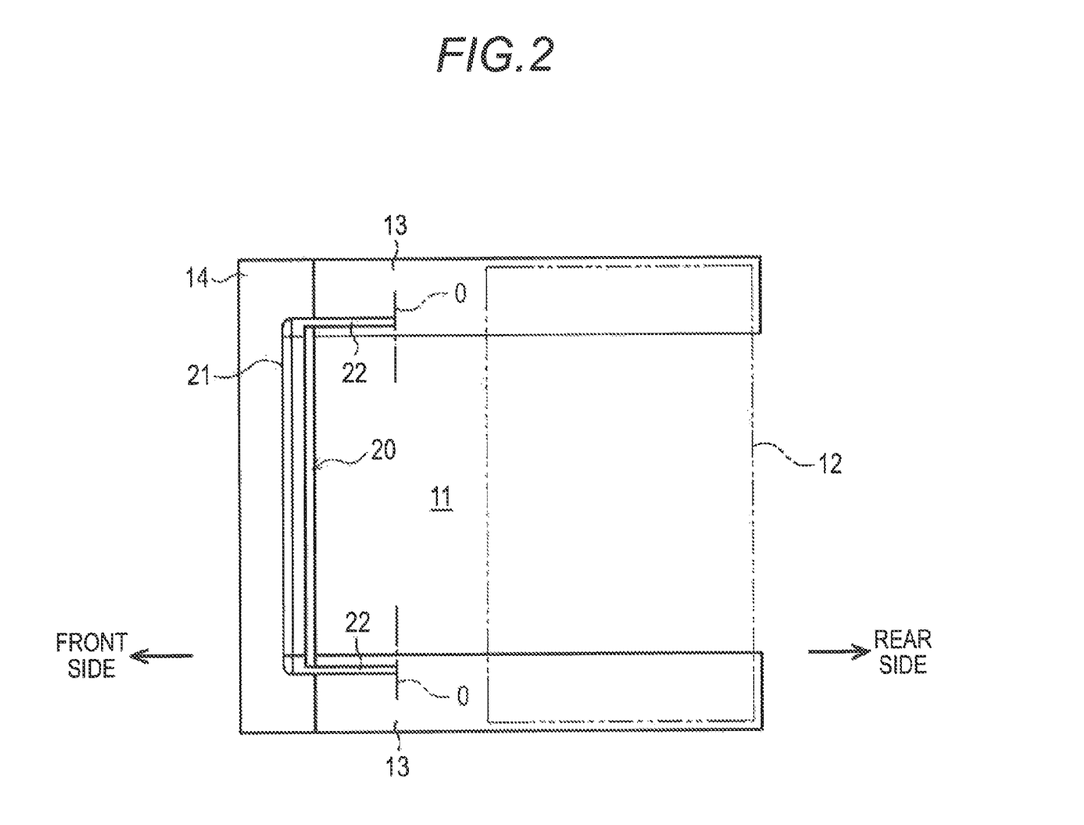
FIG. 2 is a top view illustrating the structure of the deflector device of the embodiment.

As illustrated in FIG. 2, a pair of guide rails 13 made of an extruded aluminum alloy or the like are respectively disposed in and fixed to both side edge portions of the opening 11 in the width direction of the vehicle. A front housing 14, which is a housing made of resin or the like, is disposed in and fixed to the front edge portion of the opening 11. Front edges of both the guide rails 13 are connected to each other through the front housing 14 in the width direction of the vehicle.

A suitable drive mechanism (not illustrated), which drives opening and closing of the movable panel 12, is slid against each of the guide rails 13. Both end portions of the deflector 20 in the width direction of the vehicle are respectively turnably connected to front end portions of both the guide rails 13. That is, the deflector 20 includes a deflector body 21 which is provided to extend through a space above the front housing 14 along the front edge portion of the opening 11 in the width direction of the vehicle, and a pair of arm portions 22 which are connected to both end portions of the deflector body 21 in the width direction of the vehicle, and extend toward the rear side of the vehicle. Rear ends of both the arm portions 22 are respectively connected to both the guide rails 13 such that the deflector 20 can be turned around an axial line O extending in the width direction of the vehicle. The deflector 20 is attached such that the deflector 20 can be tilted upward, specifically, if the deflector 20 is turned around the rear ends of both the arm portions 22 in one direction, front end portions of both the arm portions 22 are moved upward together with the deflector body 21. During an opening operation of the movable panel 12, the deflector 20 is released from the movable panel 12, is turned around the rear ends of both the arm portions 22 in the one direction (tilt-up operation), and protrudes upward from the roof 10 (deployed state). Alternatively, during a closing operation of the movable panel 12, the deflector 20 is pressed by the movable panel 12, is turned around the rear ends of both the arm portions 22 in the other direction, and is stored below the roof 10 (stored state). Since the deflector 20 is brought into a deployed state when the opening 11 is open, the deflector 20 prevents air vibration caused by the swirling of air into the passenger compartment.

Figure 3A:
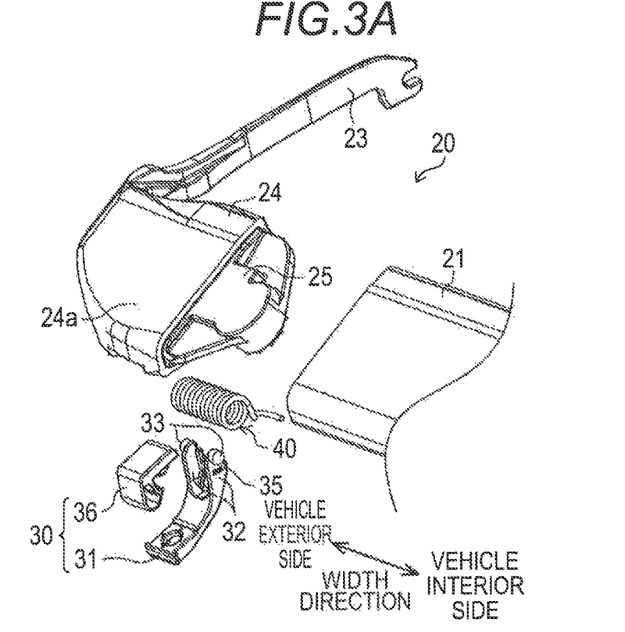
FIGS. 3A and 3B are exploded perspective views illustrating the structure of the deflector device of the embodiment which is viewed from the upper side and the lower side in a height direction of a vehicle.
Figure 3B:
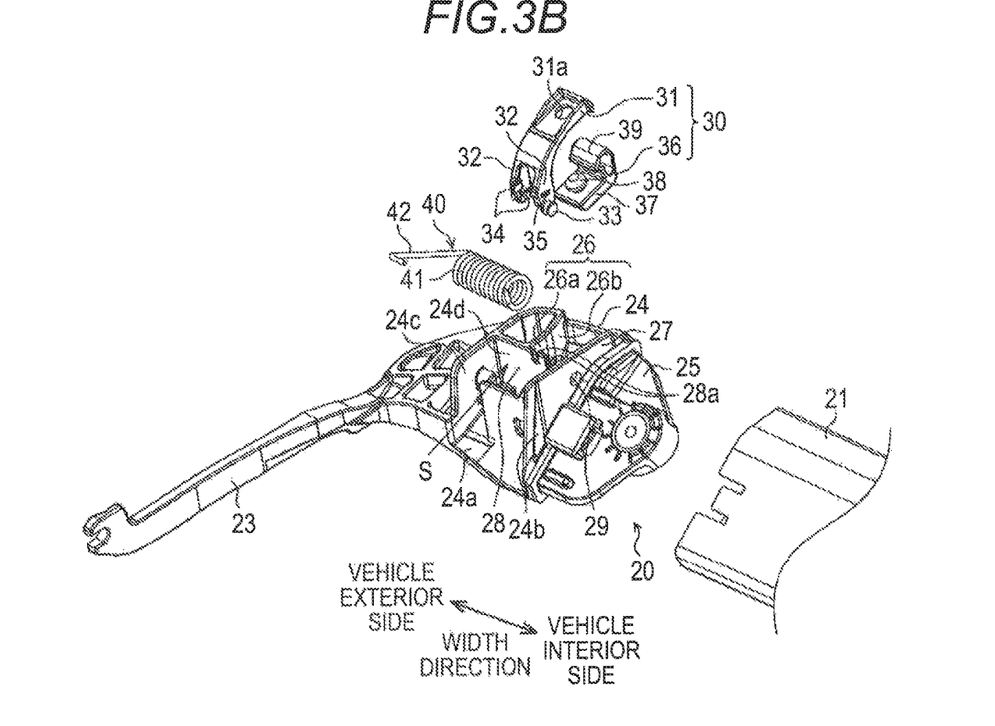

Hereinafter, the deflector body 21 and each of the arm portions 22 will be described. As illustrated in FIGS. 3A and 3B, the deflector body 21 is formed into a cylindrical shape from of an aluminum alloy. In contrast, the arm portion 22 is made of resin or the like, and includes a bar-shaped support arm 23 extending substantially in the forward and rearward direction. The arm portion 22 is turnably connected to each of the guide rails 13 via a rear end of the support arm 23. The arm portion 22 includes a substantially box-shaped support portion 24 that extends continuously from a front end of the support arm 23 toward the vehicle interior side, and a fitting portion 25 that further extends continuously from a vehicle interior side end of the support portion 24 toward the vehicle interior side. The entire outer wall surface of the fitting portion 25 is molded following an inner wall surface of the deflector body 21. The fitting portion 25 is fitted into the deflector body 21 such that the arm portion 22 is joined to the deflector body 21.

An upper wall 24a of the support portion 24 is molded such that the upper wall 24a is connected substantially flush with the deflector body 21 into which the fitting portion 25 is fitted. A flange 24b is provided in the support portion 24 such that the flange 24b protrudes substantially downward (toward the upper side in FIG. 3B) from the upper wall 24a along a boundary portion between the support portion 24 and the fitting portion 25. A flange 24c is provided in the support portion 24 such that the flange 24c is disposed closer to the vehicle exterior side than the flange 24b, and protrudes substantially downward from the upper wall 24a. Both the flanges 24b and 24c are widened while being disposed in the width direction of the vehicle and being substantially parallel to each other. A communication wall 24d is provided in a middle portion of both the flanges 24b and 24c of the support portion 24 in the forward and rearward direction such that the communication wall 24d protrudes substantially downward from the upper wall 24a. The communication wall 24d is widened while being substantially perpendicular to both the flanges 24b and 24c. The flanges 24b and 24c communicate to each other in the width direction of the vehicle via the communication wall 24d. That is, a substantially H-shaped framework is formed from both the flanges 24b and 24c and the communication wall 24d under the upper wall 24a. A space, which is bounded by the upper wall 24a, both the flanges 24b and 24c, and the communication wall 24d, and is positioned in a rear end portion of the support portion 24, forms a spring accommodation portion S.

A support wall 26 is provided in the support portion 24 such that the support wall 26 protrudes forward from a middle portion of the communication wall 24d in the width direction of the vehicle. The support wall 26 is connected also to the upper wall 24a. A rear end portion of the support wall 26, which is connected to the communication wall 24d, forms an attachment portion 26a that is widened while being positioned in the width direction of the vehicle with respect to the flange 24b and being substantially parallel to the flange 24b. A front end portion of the support wall 26, which is connected to the attachment portion 26a, forms a guide portion 26b, whose separation distance from the flange 24b in the width direction of the vehicle gradually increases toward the front side of the vehicle.

In contrast, a portion of the flange 24b, which is positioned closer to the front side of the vehicle than the communication wall 24d, forms a support wall 27. Naturally, the support wall 27 is widened while being positioned in the width direction of the vehicle with respect to the attachment portion 26a of the support wall 26 and being substantially parallel to the attachment portion 26a. A portion of the communication wall 24d, which is positioned closer to the vehicle interior side than the support wall 26, forms a connection wall 28. Substantially rectangular fitting grooves 28a, which are a pair of fitting recessed portions, are formed in a middle portion of the connection wall 28 in the width direction of the vehicle while being spaced away from each other in the width direction. Each of the fitting grooves 28a extends upward from a lower end of the connection wall 28, and opens downward and in the forward and rearward direction.

Substantially circular bearing holes 29 are respectively formed in the attachment portion 26a (support wall 26) and the support wall 27 such that the bearing holes 29 are concentric with other and open in the width direction of the vehicle. A stopper holder 31 made of resin or the like is connected to both the support walls 26 and 27. That is, the stopper holder 31 is molded into a substantially bow shape which is convex downward and obliquely rearward when viewed in its entirety, and the stopper holder 31 extends in the forward and rearward direction. An upper end portion of the stopper holder 31 is provided with a pair of supported walls 32 which are provided side by side in the width direction of the vehicle. A separation distance between both the supported walls 32 in the width direction of the vehicle is set to be the same as that between the attachment portion 26a and the support wall 27 in the width direction. Both the supported walls 32 can be interposed between the attachment portion 26a and the support wall 27.

A pair of substantially columnar shaft portions 33 are provided in the stopper holder 31 such that the pair of shaft portions 33 protrude oppositely from upper ends of both the supported walls 32 in the width direction of the vehicle. Both the shaft portions 33 of the stopper holder 31 are respectively fitted into both the shaft bearing holes 29 in a state where both the supported walls 32 are interposed between both the support walls 26 and 27 in the width direction of the vehicle. As a result, the stopper holder 31 is connected to both the support walls 26 and 27 such that the stopper holder 31 can be turned around both the shaft bearing holes 29 (an axial line extending in the width direction of the vehicle).

A substantially circular attachment hole 31a is formed in a lower end portion of the stopper holder 31, and opens substantially in the height direction of the vehicle.

Figure 4A:
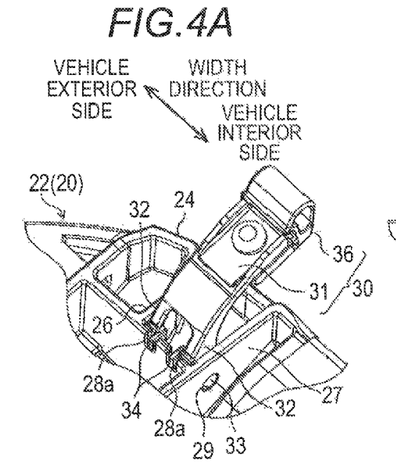
FIGS. 4A and 4B are perspective views illustrating the structure of the deflector device of the embodiment in a deployed state and a stored state.
Figure 4B:
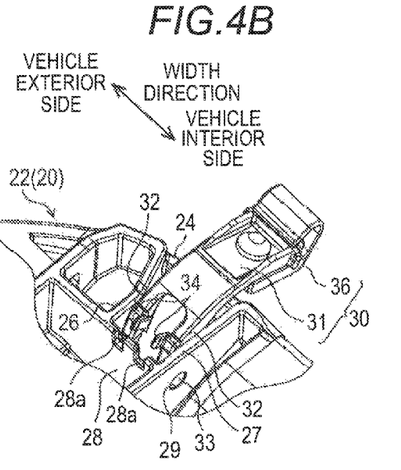

As also illustrated in FIGS. 4A and 4B, a pair of substantially rectangular claw-shaped fitting pieces 34 are provided in the stopper holder 31 such that the pair of fitting pieces 34 protrude from both the supported walls 32 toward each other in the width direction of the vehicle. Each of the fitting pieces 34 protrudes from the supported wall 32 substantially along a circumferential direction around both the shaft bearing holes 29. The fitting pieces 34 respectively face the fitting grooves 28a in the circumferential direction. As illustrated in FIG. 4A, both the fitting pieces 34 are set such that if the stopper holder 31 is raised relative to the support portion 24, both the fitting pieces 34 are respectively fitted into both the fitting grooves 28a. In contrast, as illustrated in FIG. 4B, both the fitting pieces 34 are set such that if the stopper holder 31 is fallen relative to the arm portion 22, both the fitting pieces 34 are respectively disengaged from both the fitting grooves 28a.

Figure 5A:
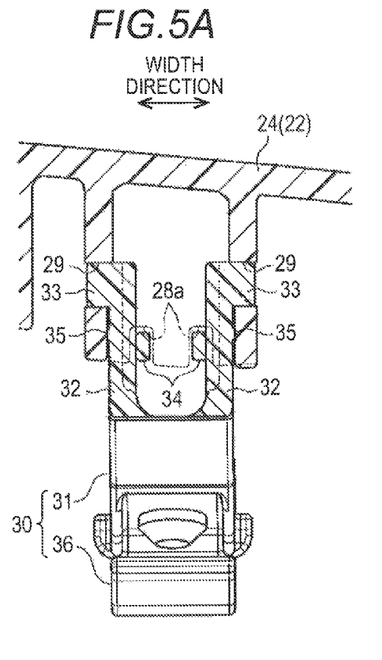
FIGS. 5A and 5B are cross-sectional views illustrating an operation of the deflector device of the embodiment.
Figure 5B:
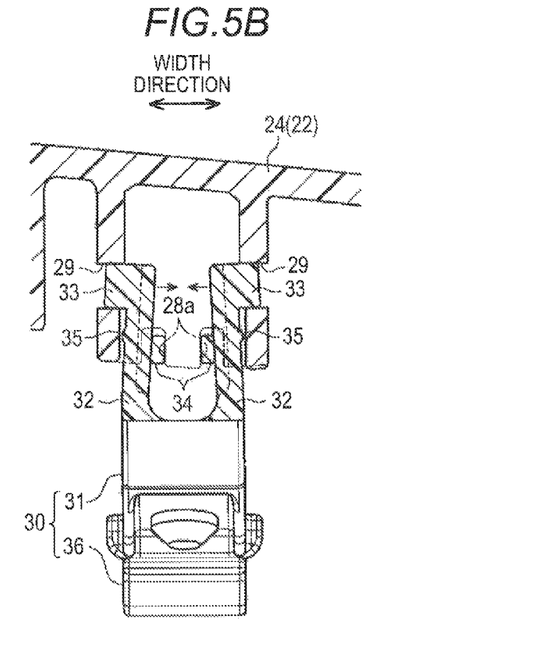

As also illustrated in FIGS. 5A and 5B, a pair of stripe-shaped ribs 35 are provided in the stopper holder 31 such that the pair of ribs 35 are positioned below the shaft portions 33 and protrude oppositely from both the supported walls 32 in the width direction of the vehicle. Both the ribs 35 are normally in press contact with facing surfaces of both the support walls 26 and 27.

As illustrated in FIGS. 3A and 3B, a stopper 36 made of rubber or the like is connected to the stopper holder 31. That is, the stopper 36 includes a substantially rectangular plate-shaped attachment portion 37 that is widened along an upper surface of the lower end portion of the stopper holder 31, and an attachment protrusion portion 38 that protrudes from the attachment portion 37 toward the stopper holder 31 while being concentric with the attachment hole 31a. The attachment protrusion portion 38 includes a columnar portion having the same outer diameter as the inner diameter of the attachment hole 31a, and an umbrella portion having a diameter larger than that of the columnar portion. If the attachment portion 37 is superimposed on the stopper holder 31, the umbrella portion passes through the attachment hole 31a while being elastically deformed. As a result, the pulling of the attachment protrusion portion 38 from the attachment hole 31a is prevented, and the stopper 36 is connected to the stopper holder 31. A sliding portion 39 is provided in the stopper 36 such that the sliding portion 39 protrudes downward from a front end of the attachment portion 37. The sliding portion 39 has a hollow bent shape in which a communication channel is formed in the width direction of the vehicle. The stopper holder 31 and the stopper 36 form a stopper member 30.

Figure 6A:
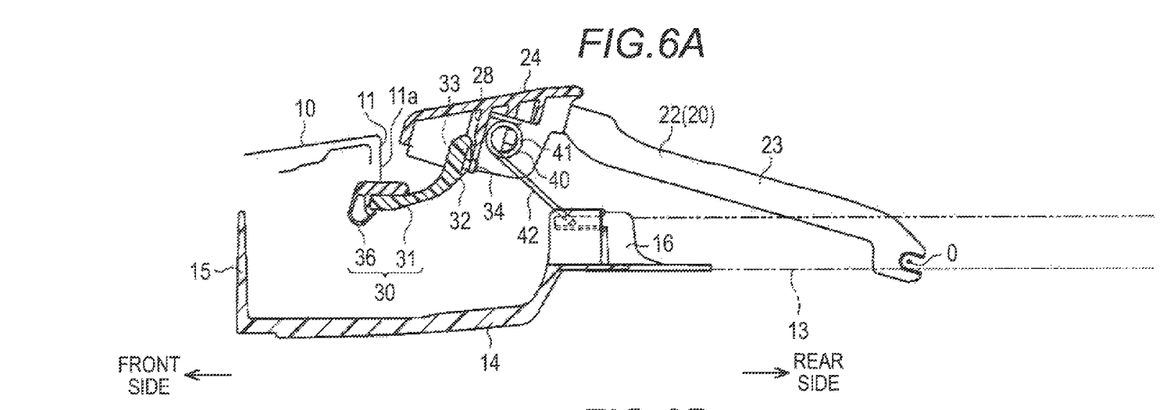
FIGS. 6A and 6B are longitudinal sectional views illustrating the structure of the deflector device of the embodiment in a deployed state and a stored state.
Figure 6B:
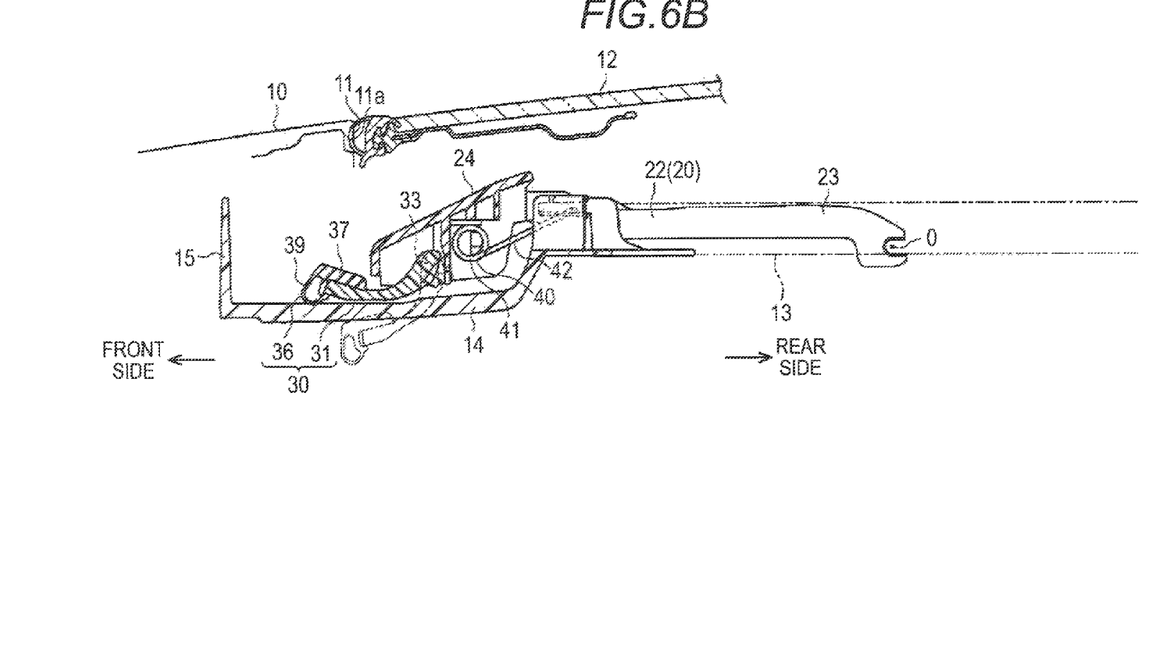

As illustrated in FIGS. 6A and 6B, the front housing 14 includes a substantially U-shaped storage portion 15 which is positioned below a front end portion of the arm portion 22 (and the deflector body 21), and in which a communication channel is formed in the width direction of the vehicle. A holding wall 16 is provided in the front housing 14 such that the holding wall 16 is positioned closer to the rear side of the vehicle than the storage portion 15, and closer to the vehicle interior side than the support arm 23, and protrudes upward. In contrast, the spring accommodation portion S accommodates a coil portion 41 of a spring 40 which is a torsional coil spring. One leg portion of the spring 40 is latched onto the support portion 24. The other leg portion 42 extends from the coil portion 41 to the holding wall 16, and is latched onto the holding wall 16 such that the other leg portion 42 can be moved in the forward and rearward direction. The arm portion 22 is normally biased by the spring 40 in a turning direction (clockwise direction as illustrated) in which the front end portion (and the deflector body 21) are moved upward.

An opening end edge of the opening 11 forms an opening flange 11a extending downward. The opening flange 11a is positioned above the storage portion 15 that is positioned closer to the front side of the vehicle than the arm portion 22 (deflector 20). As illustrated in FIG. 6A, both the supported walls 32 of the stopper holder 31 come into contact with the connection wall 28 such that the turning of the stopper member 30 in a counterclockwise direction as illustrated is restricted, and the attachment portion 37 of the stopper 36 comes into contact with the opening flange 11a such that the turning of the stopper member 30 in the clockwise direction as illustrated is restricted. As a result, the turning of the arm portion 22, in which the front end portion of the arm portion 22 is moved upward by biasing force of the spring 40, is restricted. That is, the position of the deflector 20 in a deployed state is defined by being engaged with a roof 10 side (the opening flange 11a) via the stopper member 30.

As illustrated in FIG. 6B, if the arm portion 22 (deflector 20) pressed by the movable panel 12 is turned in the counterclockwise direction as illustrated overcoming the biasing force of the spring 40, the front end portion (and the deflector body 21) of the arm portion 22 are stored in the storage portion 15. At this time, the stopper member 30 is turned around the bearing holes 29, and is placed into a fallen position while the sliding portion 39 is guided by a bottom wall of the storage portion 15. In FIG. 6B, when the position of the deflector 20 in a deployed state is maintained, the stopper member 30 is illustrated by an alternate one long and two short dashes line.

As being apparent from FIG. 6B, since the stopper member 30 is turned, and is placed into a fallen position when the deflector 20 is brought into a stored state, regardless of the stopper member 30, a disposition space of the deflector 20 in the height direction of the vehicle is kept small.

Figure 7:
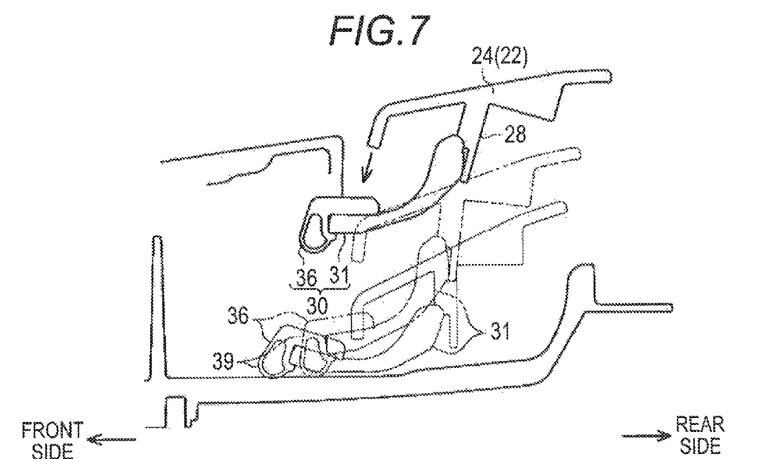
FIG. 7 is a schematic longitudinal sectional view illustrating the operation of the deflector device of the embodiment.

As illustrated by a bold solid line in FIG. 7, as described above, the position of the deflector 20 in a deployed state is defined by being engaged with the roof 10 side (opening flange 11a) via the stopper member 30. For this reason, the amount of upward protrusion (the amount of deployment) of the deflector 20 is ensured. At this time, as illustrated by an alternate one lone and two short dashes line in FIG. 7, the position of the stopper member 30, that is, the position of the stopper member 30 extending from a support position (bearing holes 29) of the support portion 24 toward the front side of the vehicle is maintained until the sliding portion 39 basically reaches the bottom wall of the storage portion 15 along with the downward movement of the front end portion (and the deflector body 21) of the arm portion 22. As illustrated by a thin solid line in FIG. 7, if the front end portion (and the deflector body 21) of the arm portion 22 is further moved downward, and the deflector 20 is brought into a stored state, the stopper member 30 is turned in the clockwise direction as illustrated, and is placed into a fallen position while the sliding portion 39 is slid toward the front side of the vehicle along the bottom wall of the storage portion 15.

Figure 8:
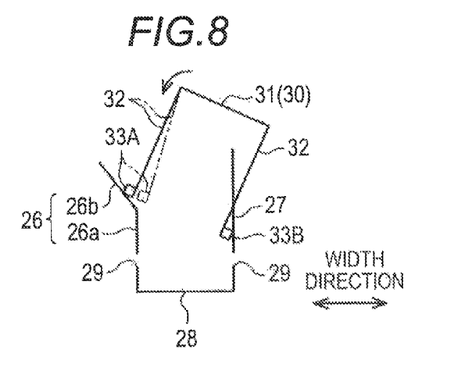
FIG. 8 is a schematic view illustrating an assembly operation of the deflector device of the embodiment.

Hereinafter, an operation of the embodiment will be described. As schematically illustrated in FIG. 8, when the stopper member 30 is to be assembled to the deflector 20, in a state where both the fitting pieces 34 cannot be respectively fitted into both the fitting grooves 28a, both the supported walls 32 are elastically deformed in the width direction of the vehicle so as to approach each other until both the shaft portions 33 are interposed between both the support walls 26 and 27. That is, both the shaft portions 33 are interposed between both the support walls 26 and 27 at a position at which a separation distance between both the support walls 26 and 27 in the width direction of the vehicle is increased due to the guide portion 26b, and both the shaft portions 33 are moved toward both the bearing holes 29 along both the support walls 26 (guide portion 26b) and 27. Specifically, in a state where both the supported walls 32 are inclined relative to the support wall 27 or the like, both the supported walls 32 are interposed between both the support walls 26 and 27 such that one side shaft portion 33 (hereinafter, also referred to as a "shaft portion 33A") comes into contact with the guide portion 26b, and an opposite side shaft portion 33 (hereinafter, also referred to as a "shaft portion 33B") comes into contact with the support wall 27 at a position closer to the bearing hole 29 than the guide portion 26b. If the stopper member 30 in this state is turned around the shaft portion 33B in the counterclockwise direction as illustrated, the shaft portion 33A is slid against the guide portion 26b toward the attachment portion 26a, and thus, both the supported walls 32 are elastically deformed in the width direction of the vehicle so as to approach each other. If the shaft portion 33A reaches the attachment portion 26a, both the shaft portions 33A and 33B are interposed between the attachment portion 26a and the support wall 27. In this state, if both the supported walls 32 are inserted between both the support walls 26 and 27 until both the shaft portions 33A and 33B respectively reach both the bearing holes 29, both the shaft portions 33A and 33B are respectively fitted into both the bearing holes 29 by an elastic return of both the supported walls 32. As a result, the stopper member 30 is turnably connected to the deflector 20.

As illustrated in FIGS. 4A and 5A, when the deflector 20 is in a deployed state, both the fitting pieces 34 of the stopper holder 31 (stopper member 30) are respectively fitted into both the fitting grooves 28a of the support portion 24 (arm portion 22). For this reason, as illustrated in FIG. 5B, elastic deformation of both the supported walls 32 in the width direction of the vehicle so as to approach each other is restricted, that is, elastic deformation of both the supported walls 32, by which both the shaft portions 33 are respectively disengaged from both the bearing holes 29, is restricted.

As described in detail above, according to the embodiment, it is possible to obtain the following effects.

(1) In the embodiment, when the stopper member 30 is to be assembled to the deflector 20, in a state where both the fitting pieces 34 cannot be respectively fitted into both the fitting grooves 28a, both the supported walls 32 are elastically deformed in the width direction of the vehicle so as to approach each other until both the shaft portions 33 are interposed between both the support walls 26 and 27. If both the supported walls 32 are inserted between both the support walls 26 and 27 until both the shaft portions 33 respectively reach both the bearing holes 29, both the shaft portions 33 are respectively fitted into both the bearing holes 29 by an elastic return of both the supported walls 32. As a result, the stopper member 30 is turnably connected to the deflector 20. In this manner, it is possible to further improve assemblability of the stopper member 30 to the deflector 20. In addition, it is possible to reduce man-hours of assembly and the cost.

In contrast, since both the fitting pieces 34 are respectively fitted into both the fitting grooves 28a in a state where the deflector 20 has protruded upward from the roof 10 (deployed state), elastic deformation of both the supported walls 32 in the width direction of the vehicle so as to approach each other is restricted, that is, elastic deformation of both the supported walls 32, by which both the shaft portions 33 are respectively disengaged from both the bearing holes 29, is restricted. As a result, it is possible to reduce the possibility of the falling of the stopper holder 31 (stopper member 30) from the deflector 20, which results from the elastic deformation of both the supported walls 32 caused by external force such as wind force while the vehicle is travelling.

In other words, even if the stopper member 30 is made of resin, it is possible to ensure the required rigidity (rigidity capable of preventing the falling of the stopper holder 31 off from the deflector 20 in a deployed state while the vehicle is travelling) of the stopper holder 31. It is possible to reduce the cost in comparison with that in a case where the stopper member 30 is made of steel.

(2) In the embodiment, the guide portion 26b is provided in the support wall 26 such that the separation distance between the support wall 26 and the support wall 27 in the width direction of the vehicle gradually increases from the position of (the vicinity of) both the bearing holes 29. Accordingly, when the stopper member 30 is to be assembled to the deflector 20, both the shaft portions 33 are interposed between both the support walls 26 and 27 at a position at which the separation distance between both the support walls 26 and 27 in the width direction of the vehicle is increased due to the guide portion 26b. Since both the shaft portions 33 are respectively moved toward both the bearing holes 29 along both the support walls 26 (guide portion 26b) and 27, both the supported walls 32 can be smoothly and elastically deformed in the width direction of the vehicle so as to approach each other. As a result, it is possible to further improve assemblability of the stopper member 30 to the deflector 20. Particularly, since both the supported walls 32 are elastically deformed by turning the stopper member 30 relative to the deflector 20, both the supported walls 32 can be elastically deformed with a smaller operation force.

(3) In the embodiment, the pair of ribs 35 respectively protrude oppositely from both the supported walls 32 in the width direction of the vehicle such that the pair of ribs 35 are respectively in press contact with both the support walls 26 and 27. As a result, it is possible to prevent the wobbling of the stopper member 30 in the width direction of the vehicle in a state where the deflector 20 has protruded upward from the roof 10 (deployed state).

(4) In the embodiment, the position of the deflector 20 in a deployed state is defined by being engaged with the roof 10 side (the opening flange 11a) via the stopper member 30 that is turnably connected to the deflector 20 (arm portion 22). As a result, it is possible to ensure the amount of upward protrusion (the amount of deployment) of the deflector in a deployed state while the required disposition space of the deflector 20 in a stored state in the height direction of the vehicle is kept small. It is possible to avoid pressure in ensuring a vehicle interior space occupied by the deflector 20 and the front housing 14.

(5) In the embodiment, since the turning center (bearing holes 29) of the stopper holder 31 (stopper member 30) is disposed in the front end portion (support portion 24) of the arm portion 22 which is spaced a short distance away from the opening flange 11a, even if the stopper member 30 is made of resin, it is possible to ensure the required rigidity of the stopper holder 31 (rigidity capable of holding the deflector 20 that is suctioned out by air streams while the vehicle is travelling). As a result, it is possible to reduce the cost in comparison with that in a case where the stopper member 30 is made of steel.

(6) In the embodiment, since the stopper 36 is provided with the sliding portion 39 having a bent shape, it is possible to reduce operating noise when the deflector 20 is being stored. In this case, since it is possible to reduce operating noise without providing a roller as in the related art, it is possible to further simplify the structure, and to reduce the cost.

(7) In the embodiment, it is possible to maintain the position of the deflector 20 in a deployed state via the stopper member 30. In other words, it is possible to prevent the upward lifting of the deflector 20 in a deployed state via the stopper member 30 while the vehicle is travelling.

(8) In the embodiment, when the deflector 20 is in a deployed state, both the supported walls 32 of the stopper holder 31 are in contact with the connection wall 28, and the attachment portion 37 of the stopper 36 is in contact with the opening flange 11a. As a result, the position of the stopper member 30 is maintained. As a result, to that extent where it is not necessary to provide a spring (second spring) or the like used to maintain the position of the stopper member 30 as in the related art, it is possible to further simplify the structure, and to reduce the cost.

The embodiment may be changed as follows.

Figure 9:
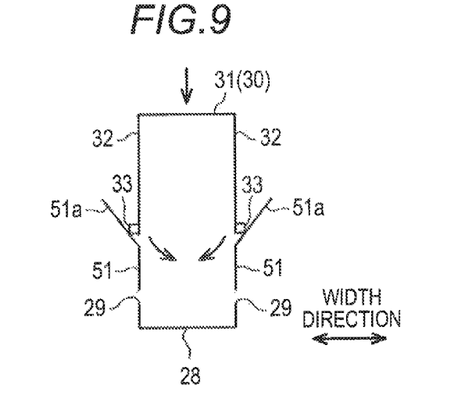
FIG. 9 is a schematic view illustrating an assembly operation of a deflector device of a modification embodiment.

As illustrated in FIG. 9, a pair of support walls 51, each of which includes a guide portion 51a and has the same shape as that of the support wall 26, may be provided. That is, a separation distance between both the support walls 51 in the width direction of the vehicle is gradually increased from the position of (the vicinity of) both the bearing holes 29 due to both the guide portions 51a. In this case, when the stopper member 30 is to be assembled to the deflector 20, at a position at which the separation distance between both the support walls 51 in the width direction of the vehicle is increased due to both the guide portions 51a, both the shaft portions 33 are interposed between both the guide portions 51a (support walls 51) such that both the fitting pieces 34 cannot be respectively fitted into both the fitting grooves 28a. Both the shaft portions 33 in this state are moved toward both the bearing holes 29 along both the guide portions 51a. Accordingly, if both the supported walls 32 are elastically deformed in the width direction of the vehicle so as to approach each other, and both the shaft portions 33 respectively reach both the bearing holes 29, both the supported walls 32 elastically return to the original state, and both the shaft portions 33 are respectively fitted into both the bearing holes 29. As a result, also in this case, it is possible to further improve assemblability of the stopper member 30 to the deflector 20.

While the assembly direction of the stopper member 30 with respect to the deflector 20 is kept the same, either of both the guide portions 51a may be omitted.

In the embodiment, a suitable spring (equivalent to the second spring in the related art), which biases the stopper holder 31 in a turning direction in which both the supported walls 32 come into contact with the connection wall 28 may be provided.

In the embodiment, instead of both the bearing holes 29 which open in the width direction of the vehicle, a pair of bearing recessed portion, which are recessed oppositely in the width direction of the vehicle, that is, bearing recessed portions, in which a through hole is not formed in the width direction of the vehicle, may be adopted.

In the embodiment, a stopper member (30), in which the stopper holder 31 and the stopper 36 are integrally formed, may be adopted. Specifically, a stopper member, in which a rubber molded body having the exterior shape of the stopper 36 is formed on the stopper holder 31 via outsert molding, may be adopted. Alternatively, a stopper member, which is a resin molded body having the exterior shape of the entirety of the stopper holder 31 and the stopper 36, may be adopted.

In the embodiment, the rib 35 protruding from each of the supported walls 32 may have a substantially hemispherical shape or a substantially frustum (truncated cone, truncated pyramid, or the like) shape. The ribs 35 may be omitted.

In the embodiment, the guide portion 26b of the support wall 26 may be omitted. In this case, when the stopper member 30 is to be assembled to the deflector 20, both the supported walls 32 may be elastically deformed in the width direction of the vehicle so as to approach each other via a suitable jig, and both the shaft portions 33 may be interposed between both the support walls (26 and 27).

In the embodiment, two sets of the fitting grooves 28a and the fitting pieces 34 that can be fitted into the fitting grooves 28a are provided. Alternatively, one set may be provided.

In the embodiment, the fitting grooves 28a, which open in the forward and rearward direction and downward, are adopted. In contrast, if an approach route of the fitting piece 34 can be opened as the stopper holder 31 is turned, the fitting groove 28a may be a long fitting recessed portion having a closed lower side. Alternatively, a fitting recessed portion which is recessed in an approaching direction of the fitting piece 34 in which the stopper holder 31 is turned, that is, a fitting recessed portion, in which a through hole is not formed in the forward and rearward direction, may be adopted.

Figure 10:
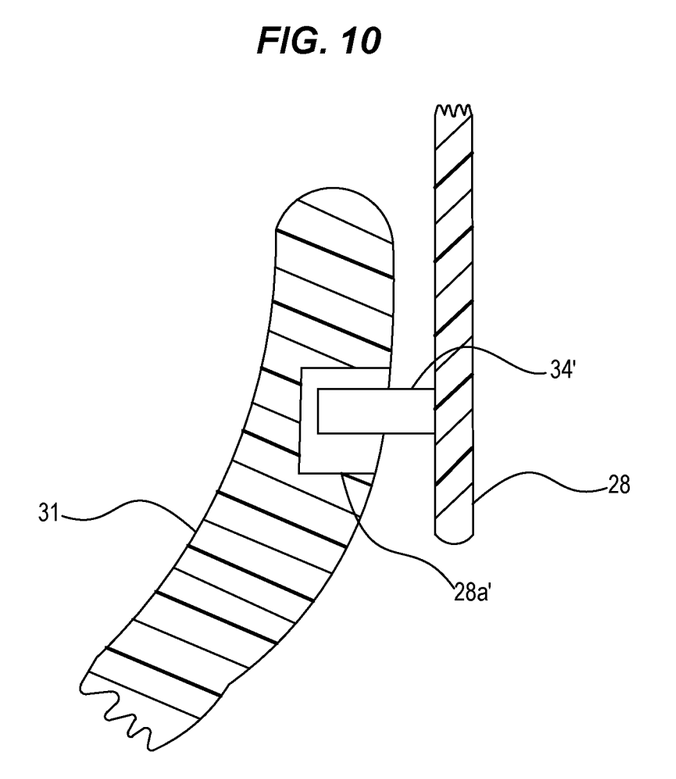
FIG. 10 is a schematic view illustrating an embodiment of the deflector device and the stopper device.

In the embodiment, the fitting grooves 28a and the fitting pieces 34 are respectively provided in the connection wall 28 (arm portion 22) and the stopper holder 31. Alternatively, the positions thereof may be reversed as illustrated in FIG. 10. That is, fitting pieces (34') and fitting grooves (28a') (fitting recessed portions) may be respectively provided in the connection wall 28 and the stopper holder 31.

In the embodiment, a plate spring may be adopted as a biasing member.

A deflector device according to an aspect of this disclosure includes: a deflector that includes a deflector body extending in a width direction of a vehicle along a front edge portion of an opening formed in a roof of the vehicle, and a pair of arm portions which are respectively connected to both end portions of the deflector body, and extend toward a rear side of the vehicle, and whose tip end portions are respectively supported by both side edge portions of the opening such that the pair of arm portions can be turned around an axial line extending in the width direction of the vehicle, and that protrudes upward from the roof as the deflector is turned in one direction, and is stored below the roof as the deflector is turned in the other direction: a biasing member that biases the deflector in a turning direction in which the deflector protrudes upward from the roof; and a stopper member which is connected to the deflector such that the stopper member can be turned around the axial line extending in the width direction of the vehicle, and which maintains the position of the deflector by being in contact with the deflector and the roof in a state where the deflector protrudes upward from the roof, and whose fallen position is maintained by a housing provided in the front edge portion of the opening in a state where the deflector is stored below the roof, and in which the deflector includes: a pair of support walls which are provided side by side in the width direction of the vehicle, and in which bearing recessed portions, which are recessed oppositely in the width direction, are formed; a pair of supported walls which are interposed between both the support walls in the width direction of the vehicle, and are provided in the stopper member side by side in the width direction, and in which shaft portions to be fitted into the bearing recessed portions respectively protrude from tip end portions of the supported walls; a fitting recessed portion that is formed in one of the deflector and the stopper member, and a fitting piece which protrudes from the other of the deflector and the stopper member, and restricts elastic deformation of both the supported walls in the width direction of the vehicle, which causes both the supported walls to approach each other, by being fitted into the fitting recessed portion in a state where the deflector protrudes upward from the roof.

With this configuration, when the stopper member is to be assembled to the deflector, in a state where the fitting piece cannot be fitted into the fitting recessed portion, both the supported walls are elastically deformed in the width direction of the vehicle so as to approach each other until both the shaft portions are interposed between both the support walls. If both the supported walls are inserted between both the support walls until both the shaft portions respectively reach both the bearing recessed portions, both the shaft portions are respectively fitted into both the bearing recessed portions by an elastic return of both the supported walls. As a result, the stopper member is turnably connected to the deflector. In this manner, it is possible to further improve assemblability of the stopper member to the deflector. In contrast, since the fitting piece is fitted into the fitting recessed portion in a state where the deflector protrudes upward from the roof, elastic deformation of both the supported walls in the width direction of the vehicle so as to approach each other is restricted, that is, elastic deformation of both the supported walls, by which both the shaft portions are respectively disengaged from both the bearing recessed portions, is restricted. As a result, it is possible to reduce the possibility of the falling of the stopper member from the deflector, which results from the elastic deformation of both the supported walls caused by external force.

In the deflector device, it is preferable that at least one of both the support walls is provided with a guide portion whose separation distance from the one support wall in the width direction of the vehicle gradually increases from the position of both the bearing recessed portions.

With this configuration, when the stopper member is to be assembled to the deflector, since at a position at which the separation distance between both the support walls in the width direction of the vehicle is increased due to the guide portion, both the shaft portions are interposed between both the support walls, and both the shaft portions are respectively moved toward both the bearing recessed portions along both the support walls (guide portion), both the supported walls can be smoothly and elastically deformed in the width direction of the vehicle so as to approach each other. As a result, it is possible to further improve assemblability of the stopper member to the deflector.

In the deflector device, it is preferable that a pair of ribs respectively protrude oppositely from both the supported walls in the width direction of the vehicle such that the pair of ribs are respectively in press contact with both the support walls.

With this configuration, since both the ribs are in press contact with both the support walls, it is possible to prevent the wobbling of the stopper member in the width direction of the vehicle particularly in a state where the deflector protrudes upward from the roof.

According to the aspect of this disclosure, it is possible to further improve assemblability.

Hereinafter, technical concepts, which can be ascertained from the embodiment and the separate examples, will be additionally described.

(A) A deflector device includes: a deflector that includes a deflector body extending in a width direction of a vehicle along a front edge portion of an opening formed in a roof of the vehicle, and a pair of arm portions which are respectively connected to both end portions of the deflector body, and extend toward a rear side of the vehicle, and whose tip end portions are respectively supported by both side edge portions of the opening such that the pair of arm portions can be turned around an axial line extending in the width direction of the vehicle, and that protrudes upward from the roof as the deflector is turned in one direction, and is stored below the roof as the deflector is turned in the other direction; a biasing member that biases the deflector in a turning direction in which the deflector protrudes upward from the roof; and a stopper member which is connected to the deflector such that the stopper member can be turned around the axial line extending in the width direction of the vehicle, and which maintains the position of the deflector by being in contact with the deflector and the roof in a state where the deflector protrudes upward from the roof, and whose fallen position is maintained by a housing provided in the front edge portion of the opening in a state where the deflector is stored below the roof, in which the deflector includes: a pair of support walls which are provided side by side in the width direction of the vehicle, and in which bearing recessed portions, which are recessed oppositely in the width direction, are formed, and a pair of supported walls which are interposed between both the support walls in the width direction of the vehicle, and are provided in the stopper member side by side in the width direction, and in which shaft portions to be fitted into the bearing recessed portions respectively protrude from tip end portions of the supported walls.

In this configuration, when the stopper member is to be assembled to the deflector, both the supported walls are elastically deformed in the width direction of the vehicle so as to approach each other until both the shaft portions are interposed between both the support walls. If both the supported walls are inserted between both the support walls until both the shaft portions respectively reach both the bearing recessed portions, both the shaft portions are respectively fitted into both the bearing recessed portions by an elastic return of both the supported walls. As a result, the stopper member is turnably connected to the deflector. In this manner, it is possible to further improve assemblability of the stopper member to the deflector.

(B) The deflector device includes a fitting recessed portion that is formed in one of the deflector and the stopper member, and a fitting piece which protrudes from the other of the deflector and the stopper member, and restricts elastic deformation of both the supported walls in the width direction of the vehicle, which causes both the supported walls to approach each other, by being fitted into the fitting recessed portion in a state where the deflector protrudes upward from the roof.

In this configuration, since the fitting piece is fitted into the fitting recessed portion in a state where the deflector protrudes upward from the roof, elastic deformation of both the supported walls in the width direction of the vehicle so as to approach each other is restricted, that is, elastic deformation of both the supported walls, by which both the shaft portions are respectively disengaged from both the bearing recessed portions, is restricted. As a result, it is possible to reduce the possibility of the falling of the stopper member from the deflector, which results from the elastic deformation of both the supported walls caused by external force.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A deflector device comprising:
    a deflector that includes a deflector body extending in a width direction of a vehicle along a front edge portion of an opening formed in a roof of the vehicle, and a pair of arm portions which are respectively connected to both end portions of the deflector body, and extend toward a rear side of the vehicle, and whose tip end portions are respectively supported by both side edge portions of the opening such that the pair of arm portions can be turned around an axial line extending in the width direction of the vehicle, and that protrudes upward from the roof as the deflector is turned in one direction, and is stored below the roof as the deflector is turned in the other direction;
    a biasing member that biases the deflector in a turning direction in which the deflector protrudes upward from the roof; and
    a stopper member which is connected to the deflector such that the stopper member can be turned around another axial line extending in the width direction of the vehicle, and which maintains the position of the deflector by being in contact with the deflector and the roof in a state where the deflector protrudes upward from the roof, and whose fallen position is maintained by a housing provided in the front edge portion of the opening in a state where the deflector is stored below the roof,
    wherein the deflector includes:
        a pair of support walls which are provided side by side in the width direction of the vehicle, and in which bearing recessed portions, which are recessed oppositely in the width direction, are formed;
        a pair of supported walls which are interposed between both the support walls in the width direction of the vehicle, and are provided in the stopper member side by side in the width direction, and in which shaft portions to be fitted into the bearing recessed portions respectively protrude from tip end portions of the supported walls;
        a fitting recessed portion that is formed in one of the deflector and the stopper member, and
        a fitting piece which protrudes from the other of the deflector and the stopper member, and restricts elastic deformation of both the supported walls in the width direction of the vehicle, which causes both the supported walls to approach each other, by being fitted into the fitting recessed portion in a state where the deflector protrudes upward from the roof.

2. The deflector device according to claim 1, wherein at least one of both the support walls is provided with a guide portion whose separation distance from the one support wall in the width direction of the vehicle gradually increases from the position of both the bearing recessed portions.

3. The deflector device according to claim 1, wherein a pair of ribs respectively protrude oppositely from both the supported walls in the width direction of the vehicle such that the pair of ribs are respectively in press contact with both the support walls.

4. The deflector device according to claim 1, wherein a pair of the fitting recessed portions are formed in the deflector while being spaced away from each other in the width direction of the vehicle, wherein a pair of the fitting pieces are formed in the stopper member corresponding to the fitting recessed portions, and wherein when the stopper member is elastically deformed in the width direction of the vehicle in order for the supported walls to approach each other in a state where the roof has protruded upward, inside surfaces of the fitting pieces in the width direction of the vehicle are respectively in contact with surfaces of the fitting recessed portion which face the fitting pieces.

\* \* \* \* \*